Nov. 2, 1965    M. M. RHEINGRUBER    3,215,435
GAME APPARATUS WITH BOARD, MARKERS, AND
TOKENS BEARING WORD FRAGMENTS Filed Oct. 31, 1960                          2 Sheets-Sheet 1

MARGARET M. RHEINGRUBER,
INVENTOR.

BY
Boniard I. Brown
ATTORNEY.

Nov. 2, 1965

M. M. RHEINGRUBER 3,215,435

GAME APPARATUS WITH BOARD, MARKERS, AND
TOKENS BEARING WORD FRAGMENTS

Filed Oct. 31, 1960

MARGARET M. RHEINGRUBER,
INVENTOR.

BY
Boniard D. Brown
ATTORNEY.

United States Patent Office 3,215,435
Patented Nov. 2, 1965

3,215,435
GAME APPARATUS WITH BOARD, MARKERS, AND TOKENS BEARING WORD FRAGMENTS
Margaret M. Rheingruber, Pomona, Calif.
(1640 Lafayette Road, Claremont, Calif.)
Filed Oct. 31, 1960, Ser. No. 66,081
34 Claims. (Cl. 273—134)

The present invention relates generally to apparatus for word construction games; more particularly, the invention relates to apparatus for analytical word construction games wherein token bear word fragments and wherein the tokens bearing word fragments of respective functional word component classifications bear distinctive symbols of their respective classifications.

A variety of devices and equipment have heretofore been utilized for games and educational activities in the fields of word formation, spelling, usage, vocabulary development and etymology. However, there has long been a need for an apparatus or equipment to provide a system of symbolization to make tangible the individual word fragments of a language, the classifications of word fragments, interrelationships of the classifications, and the utilization in word construction. Such an apparatus or device has been needed to encourage and to stimulate games and educational activities related to analytical word construction, spelling, phonetics, usage and etymology. There has existed a special need for apparatus embodying such a symbolization system and adapted to make tangible to persons having defective vision the word fragments, their functional classifications and the interrelationships thereof, and their utilization in word formation.

The present invention provides a novel apparatus for analytical word construction games or competitive activities in the above-mentioned fields. Word fragments or components, their functional classifications and interrelationships are made tangible by a plurality of tokens. Each token bears a particular word fragment. All tokens which bear word fragments of a respective functional classification bear a distinctive symbol of that classification. The word fragments or components are divided into functional classifications, which preferably are the classifications of vowel, semi-vowel, consonant, diphthong, blend, vowel digraph, consonant digraph, prefix, base morpheme or root, vowel suffix, and consonant suffix. Each particular word fragment is thus set forth on an individual token and the functional classification of that word fragment is readily identifiable by the distinctive classification symbol on the token. The respective symbols may preferably have interrelated features which correspond to the functional interrelationships of the respective classifications. These symbols may take the form of distinctively shaped areas, distinctive colors, distinctively shaped three-dimensional symbol portions, or other distinctive indicia, such as numbers.

Preferably, each token has its particular word fragment set forth on a first area or portion thereof and has the distinctive classification symbol on a second area or portion. The symbol portion and the word fragment portion have such relative positions that the word fragment is not detectable when the symbol is detectable. Each player may therefore conceal from other players the particular word fragments on tokens which he holds.

In a preferred embodiment of the invention, each of the tokens has its particular word fragment set forth by tangible Braille dots on a first portion thereof, and the tokens which bear word fragments of a respective classification have a distinctively shaped three-dimensional symbol of that classification defined on a second portion. The first and second portions have such relative positions that the word fragment is not detectable when the symbol is detectable. The apparatus is readily usable by persons having defective vision. By setting out the word fragment on each token in ordinary letters as well as by Braille dots, the apparatus is made compatible for use by fully sighted persons as well as by persons having defective vision.

Chance means, preferably in the form of a pair of dice, may be provided for determining the numbers of word fragments drawn by respective players on each round of play during a game. The chance means may also determine the moves of players' markers along a playing path on a game board in the manner hereinafter described.

Individual racks for respective players may be provided, each rack having parallel spaced shelves to accommodate and to facilitate the arrangement of each player's tokens.

Various games or activities may utilize only the word fragment tokens and the chance means. In addition to the tokens and chance means, other games or activities may utilize a game board whereon a segmented playing path is provided, and player markers to indicate the players' respective positions on the playing path. A pack of instruction cards may be used to prescribe actions, awards or penalties for players whose markers land on certain segments of the playing path. Instruction cards may also be provided of a type which specify questions and educational commands for players in accordance with the indications of chance means, which are operated by the players on each round of play.

The present invention therefore makes tangible the word fragments, their functional classifications and the interrelationships therebetween, and their utilization in word formation and in other educational activities. The invention encourages and stimulates learning processes in the fields of analytical word construction, spelling, usage, word definition, phonetics and etymology, by providing means for engaging in a variety of games and activities. Games and activities may readily be provided for various levels of player ability.

It is therefore an object of the present invention to provide a new and useful educational game apparatus.

An object of the invention is the provision of a word construction apparatus wherein a system of symbolization makes tangible the functional classifications of word fragments and their utilization.

It is an object of the invention to provide a game apparatus which encourages and stimulates educational games and activities in the fields of word construction, word definition, spelling, usage, phonetics and etymology.

An object of this invention is to provide an apparatus for word construction activities in accordance with the foregoing objects which has three-dimensional features tangible by touch to facilitate utilization by persons having defective vision.

It is an object of the present invention to provide an apparatus for analytical word construction activities wherein tokens bear word fragments and wherein the tokens bearing word fragments of respective functional classifications bear distinctive symbols of their respective classifications.

An object of this invention is the provision of an apparatus according to the foregoing object wherein each token bears its word fragment on a first area and the classification symbol of that word fragment on a second area, the first and second areas having such relative positions that the word fragment is not detectable when the symbol is detectable, whereby a player may conceal the word fragments in his possession.

It is an object of this invention to provide an apparatus according to certain of the foregoing objects wherein a particular word fragment is set forth by tangible Braille dots on each token and the symbol of the classification of that fragment is a distinctively shaped three-dimensional portion.

An object of this invention is the provision of an apparatus according to the foregoing objects which is compatible for use by sighted persons and persons having defective vision.

It is an object of the invention to provide an apparatus according to the foregoing objects wherein a board playing area has a playing path and wherein player markers indicate the respective players' position on the path.

An object of the invention is the provision of an apparatus according to the foregoing object wherein the playing path is three-dimensional and wherein the markers have identifying physical features, thereby facilitating the utilization of the apparatus by the sense of touch to facilitate utilization by players having defective vision.

Other objects, features and advantages of the present invention will become apparent to those versed in the art from a consideration of the following description, the appended claims and the accompanying drawings, wherein:

Figures 1, 2, 3, 4, 5, 6, 7, 8, 9, 10, 11, 12, 13:
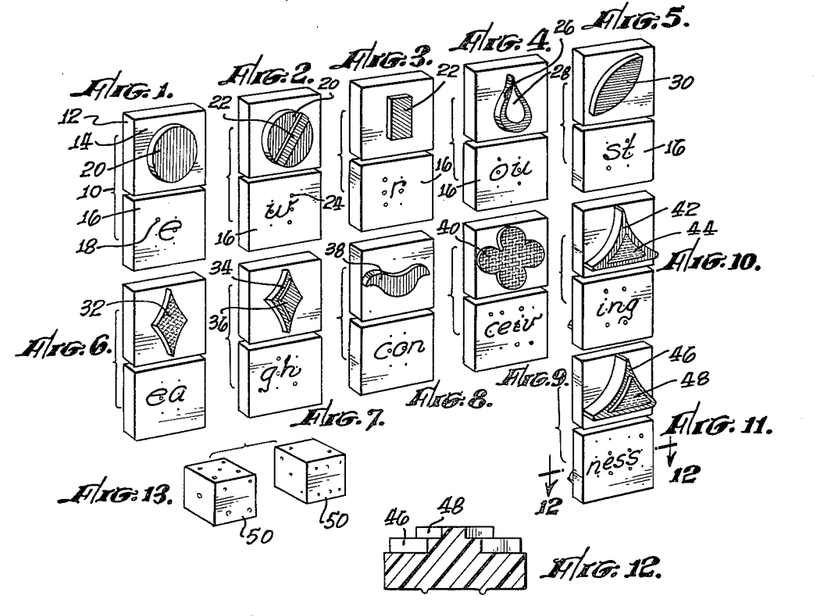
FIGURES 1 through 11 are perspective views of exemplary tokens of a preferred embodiment of the apparatus of the invention, showing a particular word fragment on one side and a classification symbol on the opposite side of each token.
FIGURE 12 is a sectional view taken at line 12—12 in FIGURE 11.
FIGURE 13 is a perspective view of a pair of dice utilized as chance means with the present invention.

Referring to the drawings, and particularly to FIGURES 1 through 13, there is shown a preferred embodiment of the apparatus of the present invention. FIGURES 1 through 11 illustrate preferred forms of game tokens, and FIGURE 13 shows a pair of dice which are utilized as chance means. The front area and the reverse area or side of each token are shown to illustrate a particular word fragment on one area and a classification symbol on the other area or side. The tokens shown are exemplary of the eleven distinctive types of tokens which represent the following eleven word fragment classifications: vowels, semi-vowels, consonants, diphthongs, blends, vowel digraphs, consonant digraphs, prefixes, base morphemes or roots, vowel-suffixes, and consonant suffixes.

Referring to token 10 of FIGURE 1 as exemplary, each token has a rectilinear base portion 12, a front area or portion 14 and a reverse area or portion 16. On the reverse or first portion a particular word fragment is set forth both in ordinary letters and in raised Braille dots or characters 18. The Braille characters are portions of a standard Braille alphabet and may be embossed, die-cast or otherwise formed on the tokens. A distinctively shaped three-dimensional classification symbol 20 is defined on the front area or second portion 14.

The token 10 of FIGURE 1 is representative of tokens which represent word fragments of the vowel classification. A red circular raised three-dimensional symbol 20 symbolizes this classification. A particular vowel, "e," is set forth on the first portion or reverse side 16 as an ordinary letter and in raised Braille dots 18.

FIGURE 2 is illustrative of tokens which represent semi-vowels, this classification being symbolized by the three-dimensional raised circular red portion 20, like that of FIGURE 1, and a raised rectangular green portion 22 superimposed on the circular portion 20. A particular semi-vowel "w" is set forth on the reverse side 16 as an ordinary letter and in raised Braille dots 24. The green rectangular portion 22 is symbolic of the consonant classification, as described hereinafter in relation to the token of FIGURE 3. The combination of the red vowel symbol and the rectangular green consonant symbol therefore accurately symbolizes a semi-vowel which is a combination of a vowel and a consonant.

FIGURE 3 shows a token which symbolizes the consonant classification by means of the green raised rectangular symbol 22. The consonant "r" is set forth on the reverse side 16.

The token shown in FIGURE 4 symbolizes the diphthong classification by means of a blue three-dimensional or raised liquid-drop shaped symbol 26 and by a drop-shaped white unraised area 28 on the portion 26. The dual drop-shape symbolizes two vowels, both of which are sounded and which slur into each other in the manner of a liquid drop. An exemplary diphthong "ou" is shown on the reverse side 16 in both letters and Braille dots.

FIGURE 5 illustrates a token which is exemplary of tokens which symbolize the blend classification by a semi-elliptical or football-shaped raised blue symbol portion 30. The blue color is indicative of the relationship of blends to diphthongs, a blend being a combination of two consonants and a diphthong being a combination of two vowels, both of which are sounded. An exemplary blend "st" is shown in letters and in Braille dots on the reverse side of the token.

A vowel digraph is symbolized by the token of FIGURE 6. This classification of word fragment, wherein two vowels are used together with only one of them sounding, is symbolized by a arcuate-sided diamond-shaped raised orange symbol 32. An exemplary vowel digraph "ea" is on the reverse side.

The token of FIGURE 7 symbolizes the consonant-digraph classification by a raised green arcuate-sided diamond-shaped portion 34, similar in shape to the symbol portion 32 of FIGURE 6, and by a smaller diamond-shaped green portion 36 superimposed on symbol portion 34. As indicated hereinbefore in relation to FIGURES 2 and 3, the color green represents consonants. The superpositioning of the smaller symbol portion 36 on symbol portion 34 symbolizes the utilization of two consonants to constitute a consonant digraph, wherein two consonants emit one sound. This superpositioning is analogous to the superpositioning in FIGURE 4 wherein two vowels are represented. It will be observed and understood that the symbols 34, 36 of FIGURE 7 and the symbols 26, 28 of FIGURE 4 facilitate the distinction between consonants and vowel digraphs and indicate their analogous relationship. It will be understood that the distinction and the relationship can be detected by touch by persons having defective vision, as well as by sighted persons. The colors provide distinctions for sighted persons, and the three-dimensional features facilitate the distinction by persons having defective vision. Of course, the color distinctions could be utilized without the three-dimensional symbolization for sighted persons.

The token of FIGURE 8 symbolizes the prefix classification by a yoke-shaped raised pink symbol portion 38. The yoke-shape infers the nature of a prefix in the teamwork of forming words. A prefix is never used alone, but is dependent upon other word-fragments to which it is affixed to govern or alter word meanings.

FIGURE 9 shows a token which symbolizes the root or base morpheme classification by means of a raised gold-colored symbol 40 which is suggestive of a gnarled root. This infers the nature of a root or base to which prefixes and suffixes may be added to alter word meanings.

The token shown in FIGURE 10 symbolizes the vowel-suffix classification by a red arcuate-sided raised triangular symbol 42 and a superimposed silver unraised triangular area 44. Consistent with the utilization of the color red to symbolize vowels on the tokens hereinbefore described, the color red on the symbol portion 42 symbolizes a suffix which begins with a vowel.

In FIGURE 11 is illustrated a token which symbolizes consonant-suffix classification by a green arcuate-sided triangular symbol 46 on which is superimposed a silver raised triangular symbol portion 48. The color green is symbolic of the fact that the suffix begins with a consonant. The similar configurations of the symbol 42 of FIGURE 10 and the symbol 46 of FIGURE 11 indicates that both tokens represent types of suffixes. The fact that symbol 48 of FIGURE 11 is raised and symbol portion 44 of FIGURE 10 is unraised provides a three-dimensional distinction between the consonant suffix and the vowel suffix.

From the foregoing description and from the drawings, it will be understood that the symbols of the respective classifications of word fragments are suggestive of the respective classifications, and that the interrelationships of the symbols are indicative of functional interrelationships of the classifications. As hereinbefore mentioned, the symbols may be colors, three-dimensional shapes, area shapes or other indicia. The colors utilized as shown and described herein indicate the classifications and inter-relationships of classifications. Regarding the three-dimensional shaped symbols, shapes are suggestive of classifications. For example, the vowel symbol is circular or round to suggest the "round" nature of vowel sounds. The consonant symbol is rectilinear to suggest the "hard" or dissonant character of consonant sounds. The token of FIGURE 2 symbolizes a semi-vowel by a combination of the round vowel symbol and the rectilinear consonant symbol. Other connotations of the configurations of particular classification symbols will be observed and appreciated.

It will therefore be understood that the three-dimensional symbols and the raised Braille dots serve the important function of facilitating the use of the game apparatus by the sense of touch alone, thereby facilitating the identification of work fragment classifications and their interrelationships by persons having defective vision. The eleven types of tokens shown in FIGURES 1 through 11 are mutually distinguishable by touch. Each classification is symbolized by a distinctive structural shape. Structural features of the different symbol types are interrelated to correspond to functional interrelationships of the functional classifications. For example, both the vowel digraph and the consonant digraph are represented by a raised diamond-shaped symbol portion, as shown in FIGURES 6 and 7. A consonant digraph is distinguished from a vowel digraph by the smaller raised diamond-shaped portion 36 superimposed on the principal raised diamond-shaped symbol portion (FIGURE 7). A person having defective vision can therefore readily distinguish the two types of digraphs by touch and can sense their relationship. As hereinbefore described, the symbols shown in FIGURES 10 and 11 are similarly related. Other relationships among symbol configurations and the interrelationships of word fragment classifications are observable.

For purposes of certain games which are hereinafter described, the word fragment tokens may be considered as divided into three categories: single fragments, double fragments and compound fragments. The single fragment category comprises word fragments of a single letter, these being the vowels, semi-vowels and consonants symbolized by the tokens of FIGURES 1, 2 and 3. The double fragment category comprises word-fragments of two letters each, and includes the diphthongs, blends, vowel digraphs and consonant digraphs symbolized by the tokens of FIGURES 4 through 7. The compound fragment category comprises the prefixes, roots, vowels suffixes and consonant suffixes, symbolized by the tokens of FIGURES 8 through 11. The word fragments of the latter category comprise from one to six letters each.

FIGURE 13 shows a pair of conventional dice 50 which are utilized with the word fragment tokens hereinbefore described to provide a game apparatus according to the present invention. The dice 50 are utilized as chance means in the playing of games with the apparatus.

Figure 14:
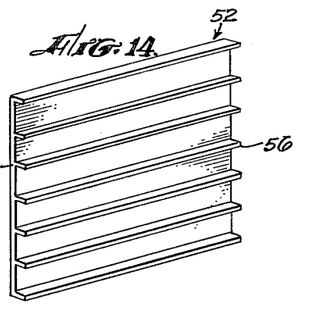
FIGURE 14 is a perspective view of a rack for organizing and arranging the word fragment tokens of FIGURES 1 through 11.

FIGURE 14 illustrates a rack 52 which may be utilized by each player in games such as those hereinafter described. The rack has a rectangular base 54 and a plurality of parallel spaced shelves 56 spaced to accommodate the tokens of FIGURES 1 through 11. Each player may use the rack to store, position and rearrange the word fragment tokens in his possession.

A variety of games may be played with the game apparatus hereinbefore described. Games may be designed for various levels of player ability and may involve various features, challenges, awards and penalties.

Figure 15:
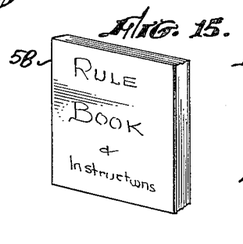
FIGURE 15 is a perspective view of a rule book for games utilizing the apparatus of the present invention.
Figure 16:
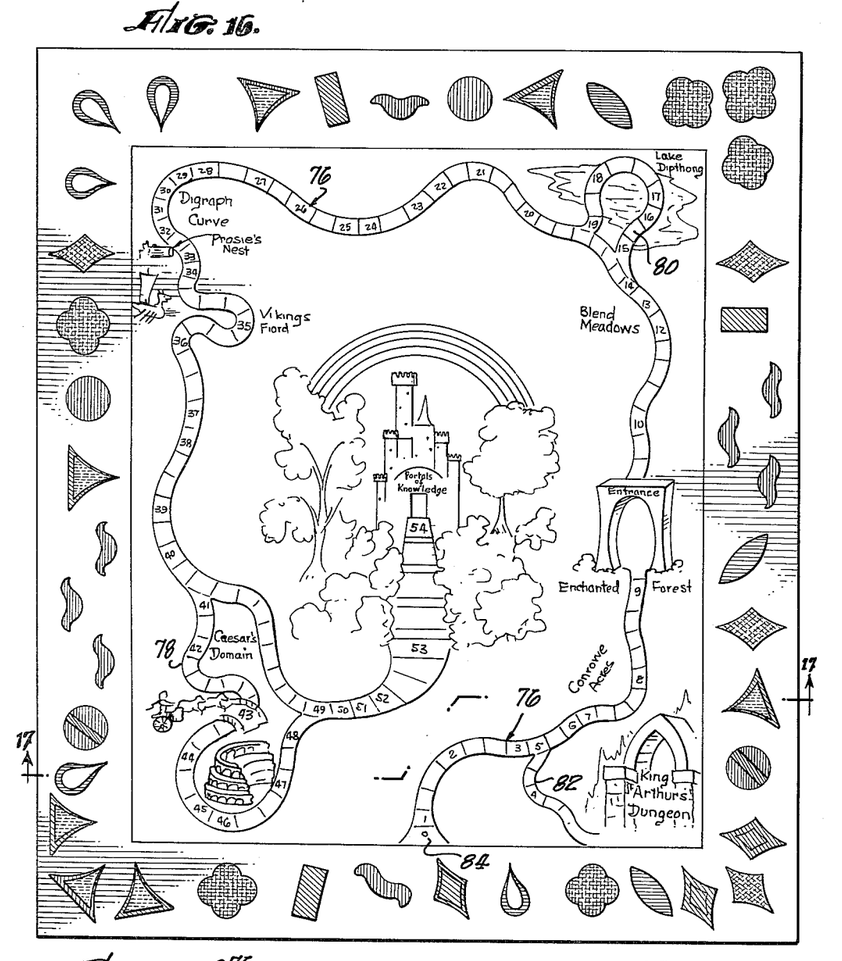
FIGURE 16 is a plan view showing a form of game board according to the invention.
Figure 17:
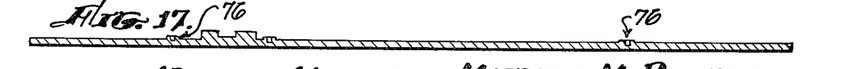
FIGURE 17 is a sectional view taken at line 17—17 of FIGURE 16.
Figure 18:
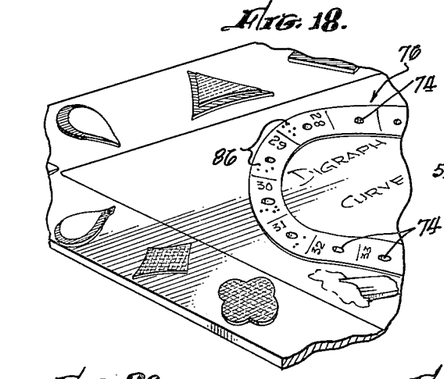
FIGURE 18 is a fragmentary perspective view of a portion of the game board of FIGURE 16, showing a portion of a blind-embossed playing path.

Certain exemplary games which may be played with the apparatus of the invention are hereinafter described. Some of these games utilize only the word fragment tokens and the chance means. Others utilize, in addition to these items, a game board and accessory equipment. A preferred form of game board is shown in FIGURES 16, 17 and 18 and is hereinafter described in detail. Markers, such as those shown in FIGURE 19, may be utilized to indicate respective players' positions on the board playing area. A rule and instruction book 58 (FIGURE 15) may provide an organized set of rules and may also provide educational and thought-provoking guides, charts and other information. A pack of instruction cards or "Mystery Cards" such as those shown in FIGURE 20 may be utilized as described hereinafter in relation to certain games.

A relatively simple or elementary game for two players utilizes only the tokens and writing materials for each player. To start a game, each of the two players first makes an arbitrary list of five or more words, each of which should be composed of four or more letters. If a player is unable to arbitrarily list sufficient words having four or more letters apiece, he may substitute two words of less than four letters each for one word of four or more letters. Thus, words of fewer than four letters are entitled to only half value in the game. A pair of such words of less than four letters must be used together throughout the game, so that the holding player will have more than three letters to work with in forming words during the game. Next, each player in succession draws a number of tokens of each classification, in accordance with the number of word fragments of each classification utilized in his arbitrary list of words. Thus, a player's word list determines the numbers and the classifications of the tokens which he draws. The players then alternately take turns, one word at a time, each player setting out one of his arbitrarily selected words in terms of the classification symbols of which the word is composed. For example, the word "dog" is set forth in symbols as consonant, vowel, consonant. As he draws tokens from a bank, each player endeavors to utilize the tokens to form words of the same classification symbol composition as the words on his arbitrary word list. Relatively incapable and young players may be confined to the use of only fragment tokens of the single and double categories, and more capable players may contest with each other utilizing fragment tokens of the double and compound categories.

After the foregoing stage of the game is finished, the players alternately turn over each of their formed words in succession, thereby exposing the particular word fragments which theretofore were concealed by the holding player from the other players. As each word is exposed to disclose its particular word fragments, each of the players lists all the words which he has been able to form from these particular word fragments. The winner of the game is the player who forms the largest number of words from each of the five exposed words. Additional points or credits may be awarded for each long vowel utilized. For relatively capable players, extra points may be awarded for the incorporation of each double fragment or other particular category of token which is utilized.

A more advanced game which may be played with the word fragment tokens and the dice is herein entitled "Definition Dilly." This game employs all of the tokens, the dice or chance means, racks, paper and pencils. Each of the players rolls the dice to determine the order of play. The player rolling the highest number becomes the first player, and the other players take turns in the order of their counter-clockwise positions from the first player.

The first player arbitrarily selects a word and write it down without revealing it to the other players. He then draws word fragment tokens from the "bank" or supply, the number of the classifications of the tokens drawn being determined by the number of classifications of the word fragments in his arbitrarily selected word. He spells out the word in terms of classification symbols with the tokens he drew. He conceals the word itself from the other players by keeping the particular word fragments on the tokens from their view. For eaxample, the word "cat" is spelled out "consonant, vowel, consonant" in terms of the symbols on the front sides of the tokens. Words with compound fragments are set out by symbols with small spaces between syllables. This requires the players to properly hyphenate words. Compound fragments are identified by positioning an appropriate word fragment symbol over appropriate word sections. For example, for the word "transcribing" the section "trans" is set out as consonant, consonant, vowel, consonant, consonant with a token bearing a prefix symbol positioned above these tokens, the latter token being drawn from the bank for the purpose. The word section "scrib" is set out as consonant, consonant, consonant, vowel consonant with a token bearing a root symbol positioned above this word section.

With his word set out in classification symbols, the first player then gives the other players the definition of the word, without stating the word. The second player endeavors to identify the word. If the second player cannot, the next successive or third player is given the opportunity to name the word. The rules of the game may provide that the first player may give the second or successive player clues to the identity of the word. The player who identifies the first player's word then places the word on his word sheet to add to his score.

The player who succeeds in identifying the word of the first player then arbitrarily selects a word and spells it in terms of symbols. The play of the game proceeds in accordance with the foregoing description.

Dictionaries and other educational aids may be used. These are of considerable value to players relative to definitions, word formation and the provision of clues.

After each person has provided an arbitrarily selected word and each such word has been identified, two or more rounds may be played, each player selecting a word on each round which must be identified by a succeeding player. This stage of the game ends when one of the players has added a certain predetermined number of words to his list. Further use of dictionaries or other educational aids is prohibited after the completion of this stage.

The player who first attains the predetermined number of words, then redefines the first word on his list and employs the word in a sentence. If he cannot do so, any other player may call "Definition Dilly," define and use the word. The player who is unable to thus redefine and use his word crosses the word off his list, while the other player adds it to his list. The play continues until each player has endeavored to define each of his words and to utilize it in a sentence. Each player may thus retain words on his list, lose words or acquire words from opponents.

The player who first achieves a specified score becomes the winner. Scoring is in terms of the utilizatoin of word fragments, as follows:

50 points for each word of three or more syllables;
10 points for each double fragment utilized; and
15 points for each compound fragment utilized.

Variations may be provided in the foregoing game. A variation for relatively adverced or capable players is played with words of compound origin which are capable only of compound definition. An example of such a word is the word "heptachord," which is of compound origin and which is defined in terms of "hepta" meaning seven and "chord" meaning string, the word defining a musical instrument of seven strings. Words are formulated by the players in terms of the classification symbols. The utilization of compound fragments in forming words is prohibited. The liberal use of good dictionaries and other educational aids is important to players of this game. The educational value of the game is thereby enhanced for even advanced and sophisticated players.

Figure 19:
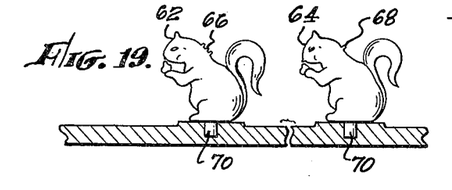
FIGURE 19 is an elevational view showing markers representing respective players on the game board playing path of FIGURES 16 and 18.

A variety of games may be played utilizing the game board, player markers, and accessories hereinbefore mentioned. FIGURES 16, 17 and 18 illustrate a preferred form of game board and FIGURE 19 shows player markers 62, 64 which are used in marking respective players' positions on the game board during a game. The markers preferably have unique configurations to clearly distinguish them from the word fragment tokens. The markers may be individually identified by means of distinctive colors or shapes. For use by persons having defective vision, the markers may be provided with individual identifying physical features, such as the Braille markings 66, 68 shown on the markers 62, 64, respectively. To faciliate their use by persons having defective vision, the markers may preferably be provided with pegs 70 (FIGURE 19) which fit into holes 74 (FIGURE 18) on the game board playing path to mark the positions of respective players. The markers may therefore be individually identified and positioned on the playing path by the sense of touch alone.

Referring to FIGURE 16, the board game layout includes a border area on which the word fragment symbols hereinbefore described are displayed both for artistic purposes and to familiarize players with the symbols which correspond to the respective word fragment classifications. There are set forth a principal segmented playing path 76, an alternate or additional segmented path 78 labeled "Caesar's Domain," a second alternate or additional segmented path 80 labeled "Lake Diphthong" and a third or divergent auxiliary segmented path 82 labeled "King Arthur's Dungeon." At the start of a game, players' markers are positioned at a starting point 84 of the principal path 76. Artistic and imaginative illustrations and legends are provided about the playing path to fulfill functional aspects in the playing of games and to suggest or depict word history and usage.

Numbered segments 1 through 54 of the playing paths indicate particular penalties or awards for players whose markers land on particular segments, in accordance with moves determined by the chance means or dice. These awards or penalties may be set forth on the game board adjacent to the respective numbered segments, or they may be indicated on appropriate instruction cards or space play cards which bear numbers corresponding to the segment numbers.

For use by persons having defective vision or blind persons, the playing path and other board features may preferably be three-dimensional. FIGURES 17 and 18 illustrate a raised or blind-embossed playing path and other raised features. Each segment of the playing paths is provided with a hole 74, as hereinbefore mentioned, to cooperate with the pegs 70 on the player markers to facilitate the movement and positioning of markers by the sense of touch. The numbers on segments which identify penalties and awards are set forth in Braille, as indicated at 86 in FIGURE 18. Functional features related to game aspects and to word history and etymology are set forth in embossed or raised form.

A relatively elementary game, herein identified as "Nike's Victory," is played with the game board, the player markers, word fragment tokens of the single fragment category only, and the dice. Only the principal playing path 76 is used. The penalties and awards indicated by the numbered segments 1 through 54 are not involved in the game.

The order of play is determined by means of the dice. The player who rolls the highest number becomes the first player, and the order of the other players is in accordance with their clockwise positions relative to the first player. To begin the game, the first player again rolls the dice. He draws from the bank a number of tokens of the vowel classification, the number being determined by the number indicated on one die. He also draws a number of word fragment tokens of the consonant classification in accordance with the number indicated on the other die. He then forms words with the particular word fragments on the tokens which he has drawn. Each player in succession then repeats the foregoing "starter play."

After the foregoing "starter plays" of the respective players, on each round of play, each player first throws the dice. He moves his marker along the playing path in accordance with the number indicated on either die which he chooses. He draws from the bank a number of vowel tokens or a number of consonant tokens, according to his choice, in accordance with the number indicated on the second die. Each player forms words, adds words to his collection, changes words and interchanges words to his best advantage during the play of the game. A player may not retain more than five unused word fragment tokens at any time. Extra tokens must be deposited in a secondary stockpile or supply to be drawn upon after the original bank or supply of tokens has been exhausted.

After a player's marker passes the entrance to the Enchanted Forest (FIGURE 16) he may draw a number of tokens of the vowel and consonant classifications, in accordance with the number indicated by either die. The player is not limited to his choice of only one or the other classification of token. He moves his marker along the playing path a number of spaces indicated by the number on the second die. For example, if one die indicates 4 and the other die indicates 6, the player may move either 4 or 6 segments along the path, according to his choice, and he may take any combination of six or four tokens, according to his choice.

The game ends when any player's marker reaches the end of the principal playing path 76 at the "Portals of Knowledge." The winner of the game is the player having the highest score, in accordance with the following scoring system:

5 points for each syllable utilized in forming words;
5 points for each long vowel utilized in forming words.

A more advanced game is entitled "Double Dilly." In addition to the apparatus utilized in the above-described game of "Nike's Victory," this game utilizes the tokens of the double fragment category: diphthongs, blends, vowel digraphs and consonant digraphs. The auxiliary playing paths 80 and 82, identified as "Lake Diphthong" and "King Arthur's Dungeon," are utilized. The plays, penalties and awards indicated by the numbered segments 1 through 54 are also employed. Only those space plays which relate to the use of word fragments of the single or double categories are observed, those relating to the compound fragment categories being ignored.

Exemplary instructions, penalties and awards, numbered to correspond with the numbered segments of the playing path, are as follows:

(1) Form a 3-letter word.
(2) What is a consonant?
(3) Form a 5-letter word.
(4) Shame on you! Correctly spell the word or the play you missed.
(5) Go back to Dungeon Junction.
(6) Name a vowel.
(7) An extra consonant for you.
(8) Free trip to Forest Entrance.
(9) Bumper crop from Convowe Acres. Take 2 vowels and 3 consonants.
(10) Take a blend.

The game is played in the same manner as herein described for the game of "Nike's Victory" up to the point where the respective players' markers pass the entrance to the Enchanted Forest. Thereafter each player may draw tokens of the double fragment classification category. The tokens may be drawn by a player in any combination of classifications, according to his choice, the total number being indicated on one die. A player's marker may be abolished to "King Arthur's Dungeon" at the outer end of the auxiliary playing path 82, as a penalty or for misspelling a word, for misusing a word fragment in a word, or for failing to use a particular word fragment in a list of words. Once a player's marker is thus abolished, the player may draw only word fragment tokens of the single category. He may not draw tokens of the double category until his marker again passes the Entrance to the Enchanted Forest.

The game ends when any player's marker reaches the end of the principal playing path at the "Portals of Knowledge." The winner of the game is the player having the highest score at that time in accordance with the following scoring system:

Points gained on various awards and instructions resulting from marker landing on numbered segments.
5 points for each syllable used;
10 points for each double fragment utilized in forming words;
15 points for each word of Scandinavian origin which is utilized.

Figure 20:
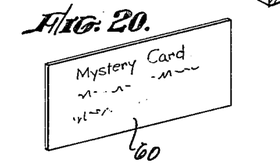
FIGURE 20 is a perspective view of an exemplary instruction card for use in the playing of games utilizing the apparatus of the invention.

An advanced game utilizing all of the apparatus hereinbefore described is identified as "Golden Glory." The game proceeds in the manner of the "Double Dilly" and "Nike's Victory" games until a player's marker passes the Entrance to the Enchanted Forest. After a player's marker passes this entrance, he draws an instruction card or Mystery Card 60 each time a 5 is indicated by the dice. When each of the dice indicates a 5, the player advances ten spaces or segments along the playing path and also draws two instruction cards or Mystery Cards 60. In addition, he is entitled to an extra throw of the dice and an extra playing opportunity. All of the space plays indicated by the numerals 1 through 54 on certain segments of the playing path are utilized.

This game emphasizes utilization and usage of word fragments of the compound category (hereinbefore described) although tokens of the single and double fragment categories are also used. The plays in the game involve the interchanging of roots, prefixes and suffixes in single and multiple combinations in forming words. A player's performance is greatly aided by his referring to dictionaries, to word charts in the instruction book or to other educational guides and materials.

The illustrations and legends on the game board have geographical, historical and etymological connotations. These illustrations and legends stimulate player interest and make the players mindful of the evolution of languages, the history of words, and the relationships of history and legends to the history of words.

As indicated above, a player may draw an instruction card 60 each time a 5 is indicated by the dice when he throws them. Each card introduces an educational command, a reward or a penalty into the game. Additional scoring may be attained when a player carries out the directions on an instruction card without reference to a key word chart, educational guide or a dictionary. Each educational command on a card must be fulfilled or the player's marker is abolished to "King Arthur's Dungeon" with resultant disadvantages mentioned above.

Examples of questions and educational commands which may be specified on individual cards are as follows:

1. What is meant by the use of the prefix "hypo" instead of the prefix "epi"?
2. There are three prefix families meaning "not." Identify these families and state which one has four members.
3. What is meant by the root "tain"? Give the other spellings of this root.
4. Take a vowel from the player at your left.
5. What root means "to write"? What root means "after it is written"?
6. Take a free trip by Nike Jet through the Enchanted Forest. Return to the playing path segment from which you started the jet trip, then advance ten spaces.
7. Take two golden roots as you encircle Caesar's Domain.
8. Give three letters to the player to your left.

The game ends when any player's marker reaches the end of the principal playing path 76 at the "Portals of Knowledge." The winner of the game is the player having the highest score at that time, in accordance with the following scoring system:

5 points for each syllable used in a word;
15 points for each word of Scandinavian origin formed by the player;
20 points for each prefix or suffix used;
10 points for each double fragment used;
50 points for each golden root used;
75 points for the utilization of a golden root of Greek origin.

Those versed in the art to which the present invention relates will readily appreciate that the invention achieves the objects and realizes the advantages hereinbefore mentioned.

Although specific embodiments of the present invention have been illustrated and described herein, it will be understood that the same are merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:

1. An apparatus for analytical word construction games, comprising a plurality of playing tokens representing a plurality of word fragments, said word fragments being divided into distinct functional word component classifications, tangible Braille dots arranged on a single surface of each token to set forth the particular word fragment represented by that token, and a distinctively shaped three-dimensional symbol of a respective one of said classifications arranged on an opposite surface of each token bearing a word fragment of that classification, said tokens thereby making tangible by touch alone the word fragments and their respective classifications, whereby a word construction game may be played by players having defective vision, wherein the players contest for victory by forming words with word fragment tokens acquired in accordance with prescribed game rules.

2. An apparatus for analytical word construction games, comprising a plurality of playing tokens representing a plurality of word fragments, said word fragments being divided into distinct functional word component classifications, each of the tokens having a particular word fragment set forth by tangible Braille dots on a first portion thereof, each token bearing a word fragment of a respective one of said classifications having a distinctively shaped three-dimensional symbol of that classification defined on a second portion thereof, said first and second token portions having such relative positions that the word fragment on the first portion is not detectable when the symbol is detectable, whereby the word fragments on particular tokens may be concealed from other players by a holding player, said tokens thereby making tangible to players by touch alone the word fragments and their respective classifications, whereby a word construction game may be played by players having defective vision, wherein the players contest for victory by forming words with word fragment tokens acquired in accordance with prescribed game rules.

3. An apparatus for analytical word construction games, comprising a plurality of playing tokens representing a plurality of word fragments, said word fragments being divided into distinct functional word component classifications, each of the tokens bearing a particular word fragment on a single surface thereof, the tokens bearing word fragments of a respective classification bearing a distinctive three-dimensional symbol of that classification only on an opposite surface thereof, the tokens thereby making tangible the respective classifications of the word fragments, whereby a word construction game may be played wherein players contest for victory by forming words with word fragment tokens acquired in accordance with prescribed game rules.

4. An apparatus for analytical word construction games, comprising a plurality of playing tokens representing a plurality of word fragments, said word fragments being divided into distinct functional word component classifications, each of the tokens bearing a particular word fragment on a single surface thereof, the tokens bearing word fragments of a respective classification bearing a distinctive three-dimensional symbol of that classification only on an opposite surface thereof, the respective symbols having interrelated features corresponding to functional interrelationships of the respective classifications, the tokens thereby making tangible the respective classifications of the word fragments, whereby a word construction game may be played wherein players contest for victory by forming words with word fragment tokens acquired in accordance with prescribed game rules.

5. A game apparatus for analytical word construction comprising a plurality of playing tokens representing a plurality of word fragments, each of the tokens bearing a particular word fragment on a single surface thereof; said plurality of word fragments being divided into the functional word component classifications of vowel, semi-vowel, consonant, diphthong, blend, vowel digraph, consonant digraph, prefix, base morpheme or root, vowel-suffix, and consonant suffix; the tokens bearing word fragments of each respective classification bearing a distinctive three-dimensional symbol of that classification only on an opposite surface thereof; said tokens thereby making tangible the respective classifications of the individual word fragments; whereby an analytical word construction game may be played wherein players contest for victory by forming words with word fragment tokens acquired in accordance with prescribed game rules.

6. An apparatus for analytical word construction games, comprising a plurality of playing tokens representing a plurality of word fragments, said word fragments being divided into distinct functional word component classifications, each of the tokens bearing a particular word fragment on a single surface thereof, the tokens bearing word fragments of a respective classification bearing a distinctive three-dimensional color symbol of that classification only on an opposite surface thereof, the respective color symbols having interrelationships corresponding to functional interrelations of the respective classifications, said color symbols thereby making tangible the respective classifications of the word fragments, whereby a word construction game may be played wherein players contest for victory by forming words with word fragment tokens acquired in accordance with prescribed game rules.

7. An apparatus for analytical word construction games, comprising a plurality of playing tokens representing a plurality of word fragments, said word fragments being divided into distinct functional word component classifications, each of the tokens bearing a particular word fragment thereon, the tokens bearing word fragments of a respective classification bearing a distinctive symbol of that classification, each of the tokens bearing its particular word fragment on one side thereof and the classification symbol of that word fragment on the opposite side thereof, the word fragment thereby being undetectable when the symbol is detectable and vice versa, whereby the word fragments and classification symbols on particular tokens may alternatively be concealed from other players by a holding player, the tokens thereby making tangible the respective classifications of the word fragments, whereby a word construction game may be played wherein players contest for victory by forming words with word fragment tokens acquired in accordance with prescribed game rules.

8. A board game apparatus for analytical word construction games, comprising a board playing area having a playing path divided into a plurality of segments, marker means for respective players to indicate the respective players' positions on said playing path, and a plurality of playing tokens representing a plurality of word fragments, said word fragments being divided into distinct functional word component classifications, each of the tokens bearing a particular word fragment thereon, the tokens bearing word fragments of a respective one of said classifications bearing a distinctive three-dimensional symbol of that classification, the tokens thereby making tangible the respective classifications of the word fragments, said tokens being obtainable by respective players in accordance with chance means or through chance in progressing about the playing path in accordance with chance-determined moves, whereby a word construction board game may be played wherein players contest for victory by forming words with word fragment tokens acquired while moving their markers along said playing path in accordance with prescribed game rules.

9. A board game apparatus for analytical word construction games, comprising a board playing area having a playing path divided into a plurality of segments, marker means for respective players to indicate the respective players' positions on said playing path, and a plurality of playing tokens representing a plurality of word fragments, said word fragments being divided into distinct functional word component classifications, each of the tokens bearing a particular word fragment thereon, the tokens bearing word fragments of a respective one of said classifications bearing a distinctive three-dimensional symbol of that classification, the tokens thereby making tangible the respective classifications of the word fragments, said tokens being obtainable by respective players in accordance with chance means or through chance in progressing about the playing path in accordance with chance-determined moves, and a pair of dice to be thrown by the respective players on each round of play during a game for one die to determine the numbers of tokens acquired by respective players and for the other die to determine the number of segments the respective players' markers move along said playing path, whereby a word construction board game may be played wherein players contest for victory by forming words with word fragment tokens acquired while moving their markers along said playing path in accordance with prescribed game rules.

10. A board game apparatus for analytical word construction games, comprising a board playing area having a playing path divided into a plurality of segments, marker means for respective players to indicate the respective players' positions on said playing path, and a plurality of playing tokens representing a plurality of word fragments, said word fragments being divided into distinct functional word component classifications, each of the tokens bearing a particular word fragment thereon, the tokens bearing word fragments of a respective one of said classifications bearing a distinctive three-dimensional symbol of that classification, the tokens thereby making tangible the respective classifications of the word fragments, said tokens being obtainable by respective players in accordance with chance means or through chance in progressing about the playing path in accordance with chance-determined moves, racks for respective players, each rack having parallel spaced shelves for the accommodation and arangement of a player's tokens, and a pack of instruction cards for prescribing particular actions, awards and penalties, certain of said playing path segments bearing designations instructing a player whose marker lands thereon to draw cards from said pack, whereby a word construction board game may be played wherein players contest for victory by forming words with word fragment tokens acquired while moving their markers along said playing path in accordance with prescribed game rules.

11. A board game apparatus for analytical word construction games, comprising a board playing path divided into a plurality of segments, marker means for respective players to indicate the respective players' positions on said playing path, a plurality of playing tokens representing a plurality of word fragments, said word fragments being divided into distinct functional word component classifications, each of the tokens bearing a particular word fragment thereon, the tokens bearing word fragments of a respective classification bearing a distinctive symbol of that classification, each of the tokens bearing its particular word fragment on a first area thereof and the classification symbol of that word fragment on a second area thereof, said first and second token areas having such relative positions that the word fragment area is not detectable when the symbol area is detectable, and when the symbol area is not detachable the word fragment area is detachable, whereby the word fragments and classification symbols on particular tokens may alternatively be concealed from other players by a holding player, and chance means operable by respective players on each round of play of a game to determine the number of word fragment tokens drawn by the respective players and the number of segments the respective players' markers move along said playing path, certain of said playing path segments bearing designations indicating awards and penalties for players whose markers stop thereon in acordance with said chance-determined moves, whereby a word construction board game may be played wherein players contest for victory by forming words with word fragment tokens acquired while moving their markers along said playing path in accordance with prescribed game rules.

12. A board game apparatus for analytical word construction games, comprising a board playing path divided into a plurality of segments, marker means for respective players to indicate the respective players' positions on said playing path, a plurality of playing tokens representing a plurality of word fragments, said word fragments being divided into distinct functional word component classifications, each of the tokens bearing a particular word fragment thereon, the tokens bearing word fragments of a respective classification bearing a distinctive symbol of that classification, each of the tokens bearing its particular word fragment on a first area thereof and the classification symbol of that word fragment on a second area thereof, said first and second token areas having such relative positions that the word fragment area is not detectable when the symbol area is detectable, and when the symbol area is not detectable the word fragment area is detectable, whereby the word fragments and classification symbols on particular tokens may alternatively be concealed from other players by a holding player, chance means operable by respective players on each around of play of a game to determine the number of word fragment tokens drawn by the respective players and the number of segments the respective players' markers move along said playing path, racks for respective players, each rack having parallel spaced shelves for the accommodation and arrangement of a player's tokens, and a pack of instruction cards for prescribing particular actions, awards and penalties, certain of said playing path segments bearing designations instructing a player whose marker lands thereon to draw cards from said pack, whereby a word construction board game may be played wherein players contest for victory by forming words with word fragment tokens acquired while moving their markers along said playing path in accordance with prescribed game rules.

13. A board game apparatus for analytical word construction games, comprising a board playing area having a playing path divided into a plurality of segments, markers for respective players to indicate the respective players' positions on the playing path, a plurality of playing tokens representing a plurality of word fragments, said word fragments being divided into distinct functional word component classifications, each of the tokens having a particular word fragment set forth by tangible Braille dots on a first portion thereof, the token bearing word fragments of a respective classification having a distinctively shaped three-dimensional symbol of that classification defined on a second portion thereof, said first and second token portions having such relative positions that the word fragment on the first portion is not detectable when the symbol is detectable, whereby the word fragments on particular tokens may be concealed from other players by a holding player, and chance means operable by the respective players on each round of play during a game for determining the numbers of tokens acquired by the respective players and the numbers of segments the respective players' markers move along said playing path, whereby a word construction game may be played by players having defective vision, wherein the players contest for victory by forming words with word fragment tokens acquired while moving their markers along said playing path in accordance with prescribed game rules.

14. A board game apparatus for analytical word construction games, comprising a board playing area, a blind-embossed three-dimensional playing path defined on the playing area to be sensed by touch, markers for respective players to indicate the respective players' positions on the playing path, a plurality of playing tokens representing a plurality of word fragments, said word fragments being divided into distinct functional word component classifications, each of the tokens having a particular word fragment set forth by tangible Braille dots on a first portion thereof, the tokens bearing word fragments of a respective classification having a distinctively shaped three-dimensional symbol of that classification defined on a second portion thereof, said first and second token portions having such relative positions that the word fragment on the first portion is not detectable when the symbol is detectable, whereby the word fragments on particular tokens may be concealed from other players by a holding player, and chance means operable by the respective players on each round of play during a game for determining the numbers of tokens acquired by the respective players and the numbers of segments the respective players' markers move along said playing path, whereby a word construction game may be played by players having defective vision, wherein the players contest for victory by forming words with word fragment tokens acquired while moving their markers along said playing path in accordance with prescribed game rules.

15. A board game apparatus for analytical word construction games, comprising a board playing area, a segmented playing path defined on the playing area and adapted to be sensed by touch, markers for respective players to indicate the respective players' positions on the playing path, said markers having respective identifying physical features to facilitate identification of each marker by touch, each marker and said playing path segments having cooperating peg-and-hole means to facilitate the movement and positioning of the markers on the playing path by persons having defective vision, a plurality of playing tokens representing a plurality of word fragments, said word fragments being divided into distinct functional word component classifications, each of the tokens having a particular word fragment set forth by tangible Braille dots on a first portion thereof, the tokens bearing word fragments of a respective classification having a distinctively shaped three-dimensional symbol of that classification defined on a second portion thereof, said first and second token portions having such relative positions that the word fragment on the first portion is not detectable when the symbol is detectable, whereby the word fragments on particular tokens may be concealed from other players by a holding player, and chance means operable by the respective players on each round of play during a game for determining the numbers of tokens acquired by the respective players and the numbers of segments the respective players' markers move along said playing path, whereby a word construction game may be played by players having defective vision, wherein the players contest for victory by forming words with word fragment tokens acquired while moving their markers along said playing path in accordance with prescribed game rules.

16. A board game apparatus for analytical word construction games, comprising a board playing area having a playing path divided into a plurality of segments, markers for respective players to indicate the respective players' positions on the playing path, a plurality of playing tokens representing a plurality of word fragments, said plurality of word fragments being divided into the functional word component classifications of vowel, semi-vowel, consonant, diphthong, blend, vowel digraph, consonant digraph, prefix, base morpheme or root, vowel-suffix, and consonant suffix; each of the tokens having a particular word fragment set forth by tangible Braille dots on a first portion thereof, the tokens bearing word fragments of a respective classification having a distinctively shaped three-dimensional symbol of that classification defined on a second portion thereof, said first and second token portions having such relative positions that the word fragment on the first portion is not detectable when the symbol is detectable, whereby the word fragments on particular tokens may be concealed from other players by a holding player, and chance means operable by the respective players on each round of play during a game for determining the numbers of tokens acquired by the respective players and the numbers of segments the respective players' markers move along said playing path, whereby a word construction game may be played by players having defective vision, wherein the players contest for victory by forming words with word fragment tokens acquired while moving their markers along said playing path in accordance with prescribed game rules.

17. A board game apparatus for analytical word construction games, comprising a board playing area, a three-dimensional blind-embossed segmented playing path defined on the playing area to be sensed by touch, markers for respective players to indicate the respective players' positions on the playing path, said markers having respective identifying physical features to facilitate identification of each marker by touch, each marker and said playing path segments having cooperating peg-and-hole means to facilitate the movement and positioning of the markers on the playing path by persons having defective vision, a plurality of playing tokens representing a plurality of word fragments, said word fragments being divided into distinct functional word component classifications, each of the tokens having a particular word fragment set forth by tangible Braille dots on a first portion thereof, the tokens bearing word fragments of a respective classification having a distinctively shaped three-dimensional symbol of that classification defined on a second portion thereof, said first and second token portions having such relative positions that the word fragment on the first portion is not detectable when the symbol is detectable, whereby the word fragments on particular tokens may be concealed from other players by a holding player, chance means operable by the respective players on each round of play during a game for determining the numbers of tokens acquired by the respective players and the numbers of segments the respective players' markers move along said playing path, racks for respective players, each rack having parallel spaced shelves for the accommodation and arrangement of a player's tokens, and a pack of instruction cards for prescribing particular actions, awards and penalties, certain of said playing path segments bearing designations instructing a player whose marker lands thereon to draw cards from said pack, whereby a word construction game may be played by players having defective vision, wherein the players contest for victory by forming words with word fragment tokens acquired while moving their markers along said playing path in accordance with prescribed game rules.

18. An apparatus for analytical word construction games, comprising a plurality of playing tokens representing a plurality of word fragments, said word fragments being divided into distinct functional word component classifications, each of the tokens bearing a particular word fragment thereon, the tokens bearing word fragments of a respective classification bearing a distinctive symbol of that classification, said word fragments being arranged on a first portion of said tokens, and said component classification symbols being arranged on a second portion of said tokens, said first and second token portions having such relative positions that the word fragments on the first portions are not detectable when the symbols are detectable, and said symbols on said second portions are not detectable when said word fragments are detectable, the tokens thereby making tangible the respective classifications of the word fragments, whereby a word construction game may be played wherein players contest for victory by forming words with word fragment tokens acquired in accordance with prescribed game rules.

19. An apparatus for analytical word construction games, comprising a plurality of playing tokens representing a plurality of word fragments, said word fragments being divided into distinct functional word component classifications, each of the tokens bearing a particular word fragment thereon, the tokens bearing word fragments of a respective classification bearing a distinctive three-dimensional symbol of that classification, said word fragments being arranged on a first portion of said tokens, and said component classification symbols being arranged on a second portion of said tokens, said first and second token portions having such relative positions that the word fragments on the first portion are not detectable when the symbols are detectable, and said symbols on said second portions are not detectable when said word fragments are detectable, the tokens thereby making tangible the respective classifications of the word fragments, whereby a word construction game may be played wherein players contest for victory by forming words with word fragment tokens acquired in accordance with prescribed game rules.

20. Apparatus as described in claim 18, wherein at least one of said tokens bears a symbol indicative of a vowel classification in the form of a raised circle.

21. Apparatus as described in claim 18 wherein at least one of said tokens bears a symbol indicative of a consonant classification in the form of a raised rectangle.

22. Apparatus as described in claim 18 wherein at least one of said tokens bears a symbol indicative of a semi-vowel classification in the form of a raised rectangular portion superimposed on a circular portion.

23. Apparatus as described in claim 18 wherein at least one of said tokens bears a symbol indicative of diphthong classification in the form of an unraised drop-shaped portion superimposed on a raised drop-shaped portion.

24. Apparatus as described in claim 18 wherein at least one of said tokens bears a symbol indicative of a blend classification in the form of a semi-elliptical raised portion.

25. Apparatus as described in claim 18 wherein at least one of said tokens bears a symbol indicative of a vowel digraph classification in the form of an arcuate-sided diamond-shaped raised portion.

26. Apparatus as described in claim 18 wherein at least one of said tokens bears a symbol indicative of a consonant-digraph classification in the form of a diamond-shaped portion superimposed on an arcuate-sided diamond-shaped portion.

27. Apparatus as described in claim 18 wherein at least one of said tokens bears a symbol indicative of a prefix classification in the form of a yoke-shaped raised portion.

28. Apparatus as described in claim 18 wherein at least one of said tokens bears a symbol indicative of a root or base morpheme classification in the form of a raised, gnarled, root-like portion.

29. Apparatus as described in claim 18 wherein at least one of said tokens bears a symbol indicative of the vowel-suffix classification in the form of a first unraised triangular symbol superimposed upon a second raised arcuate-sided triangular symbol.

30. Apparatus as described in claim 18 wherein at least one of said tokens bears a symbol indicative of the consonant-suffix classification in the form of a first raised triangular symbol superimposed upon a second raised arcuate-sided triangular symbol.

31. Apparatus for development of language skills, comprising: a plurality of playing tokens representing a plurality of language fragments, said language fragments being divided into distinct classifications, each of said tokens bearing a distinctive symbol of a particular language fragment on a first portion thereof, and each of said tokens bearing a distinctive symbol of a particular fragment classification on a second portion thereof, said first and second token portions being so arranged so that when said first portion is visually detectable said second portion is not, and vice versa, said tokens thereby making tangible the relation of said respective classifications and fragments.

32. Apparatus as in claim 31 wherein at least one of said symbols is three dimensional.

33. A board game apparatus for analytical language construction games, comprising a board playing area having a playing path divided into a plurality of segments, marker means for respective players to indicate the respective players' positions on said playing path and a plurality of playing tokens representing a plurality of language fragments, said language fragments being divided into distinct classifications, each of said tokens bearing a distinctive symbol of a particular language fragment on a first portion thereof, and each of said tokens bearing a distinctive symbol of a particular fragment classification on a second portion thereof, said first and second token portions being so arranged so that when said first portion is visually detectable said second portion is not, and vice versa, said tokens thereby making tangible the relation of said respective classifications and fragments, said tokens being obtainable by respective players in accordance with chance means or through chance in progressing about the playing path in accordance with chance-determined moves, whereby a language construction board game may be played wherein players contest for victory by forming sentences or portions thereof with language fragment tokens acquired while moving their markers along said playing path in accordance with prescribed game rules.

34. Apparatus as in claim 33 wherein at least one of said symbols is three-dimensional.

References Cited by the Examiner

UNITED STATES PATENTS

| | | | |
|---|---|---|---|
| 1,682,686 | 8/28 | Rutherford | 35—71 |
| 1,686,237 | 10/28 | Hoexter | 273—137 |
| 1,747,767 | 2/30 | French | 273—135 |
| 2,026,082 | 12/35 | Darrow | 273—134 |
| 2,265,334 | 12/41 | Armbruster | 273—152 |
| 2,399,041 | 4/46 | Kleber | 273—131 |
| 2,464,146 | 3/49 | Mohler | 273—135 |
| 2,491,883 | 12/49 | Welch | 35—71 |
| 2,549,708 | 4/51 | Post | 273—135 |

OTHER REFERENCES

Playthings Magazine, January 1960, p. 123.

DELBERT B. LOWE, *Primary Examiner.*

LEONARD W. VARNER, Jr., JAMES W. LOVE, *Examiners.*